(12) United States Patent
Jorge et al.

(10) Patent No.: US 9,593,048 B2
(45) Date of Patent: Mar. 14, 2017

(54) ALUMINA-MAGNESIA PRODUCT FOR GASIFIER OR FOR METALLURGICAL FURNACE

(71) Applicant: SAINT-GOBAIN CENTRE DE RECHERCHES ET D'ETUDES EUROPEEN, Courbevoie (FR)

(72) Inventors: Eric Jorge, Les Valayans (FR); Olivier Francy, L'isle sur la Sorgue (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 14/653,988

(22) PCT Filed: Dec. 19, 2013

(86) PCT No.: PCT/IB2013/061155
§ 371 (c)(1),
(2) Date: Jun. 19, 2015

(87) PCT Pub. No.: WO2014/097219
PCT Pub. Date: Jun. 26, 2014

(65) Prior Publication Data
US 2015/0353427 A1    Dec. 10, 2015

(30) Foreign Application Priority Data

Dec. 19, 2012 (FR) .................. 12 62349

(51) Int. Cl.
| | |
|---|---|
| C04B 35/109 | (2006.01) |
| F27D 5/00 | (2006.01) |
| C25C 7/00 | (2006.01) |
| C04B 35/05 | (2006.01) |

(52) U.S. Cl.
CPC ............ *C04B 35/109* (2013.01); *C04B 35/05* (2013.01); *C25C 7/005* (2013.01); *F27D 5/0031* (2013.01); *C04B 2235/3206* (2013.01); *C04B 2235/3244* (2013.01); *Y02P 10/262* (2015.11)

(58) Field of Classification Search
CPC ..................................................... C04B 35/109
See application file for complete search history.

(56) References Cited

U.S. PATENT DOCUMENTS

| | | | |
|---|---|---|---|
| 5,418,199 | A | 5/1995 | Knauss |
| 8,497,222 | B2 | 7/2013 | Jorge |
| 8,618,007 | B2 | 12/2013 | Cabodi et al. |

FOREIGN PATENT DOCUMENTS

| | | |
|---|---|---|
| FR | 2915195 A1 | 10/2008 |
| FR | 2946044 A1 | 12/2010 |
| SU | 419495 A1 | 3/1974 |
| SU | 50751976-03-2542 A1 | 3/1976 |
| SU | 1248997 * | 8/1986 |
| SU | 1470731 * | 4/1989 |

OTHER PUBLICATIONS

International Search Report for PCT/IB2013/061155 dated Mar. 11, 2014.

* cited by examiner

*Primary Examiner* — Karl Group
(74) *Attorney, Agent, or Firm* — Cooper Legal Group, LLC

(57) ABSTRACT

The invention relates to a melted and cast refractory product having a chemical composition such that, in mass percentages on the basis of the oxides: $Al_2O_3$: complement up to 100%; MgO: 26% to 50%; $ZrO_2$: 0.5% to 10.0%; $B_2O_3$: <1.5%; $SiO_2$: ≤0.5%; $Na_2O+K_2O$: ≤0.3%; CaO: ≤1.0%; $Fe_2O_3+TiO_2$: <0.55%; other oxide species: <1.0%. In said product, the elementary mass ratio R of the zirconium content to the total boron, fluorine and silicon content is between 2 and 80.

19 Claims, No Drawings

US 9,593,048 B2

ALUMINA-MAGNESIA PRODUCT FOR GASIFIER OR FOR METALLURGICAL FURNACE

TECHNICAL FIELD

The invention relates to a fused-cast refractory product, in particular intended for a gasifier, for a metallurgical furnace, or for a glass furnace.

PRIOR ART

Among refractory products, a distinction is conventionally made between fused-cast products and sintered products.

Unlike sintered products, fused-cast products usually include an intergranular glassy phase linking crystallized grains. The problems posed by sintered products and by fused-cast products, and the technical solutions adopted for solving them, are therefore generally different. A composition developed for manufacturing a sintered product is therefore a priori unable to be used as such for manufacturing a fused-cast product, and vice versa.

Fused-cast products, often called "electrocast" products, are obtained by melting a mixture of appropriate raw materials in an electric arc furnace or by any other technique suitable for these products. The molten material is then cast in a mold, after which the product obtained undergoes a controlled cooling cycle so as to be brought to room temperature without fracturing. This operation is called "annealing" by those skilled in the art. It may also be free cooling, according to the molding technology used.

The fused-cast product Monofrax® L, produced and sold by RHI Monofrax Ltd, has a chemical composition comprising 53.6% $Al_2O_3$, 44.9% MgO, 0.44% silica $SiO_2$, 0.23% sodium oxide $Na_2O$ and less than 0.35% CaO by weight.

The gasification of coal is a process, known for about fifty years, which currently is undergoing considerable development. Specifically, it allows the production, on the one hand, of syngas (CO, $H_2$)—a clean energy source—and, on the other hand, of basic compounds for the chemical industry starting from very diverse hydrocarbon materials, for example coal, petroleum coke or even heavy oils to be recycled. This process furthermore makes it possible to remove the undesirable components, for example NOx, sulfur or mercury, before any discharge into the atmosphere.

The principle of gasification consists of a controlled partial combustion, in steam and/or oxygen, at a temperature of between about 1150° C. and 1600° C. and under pressure.

There are various types of gasifier: fixed bed gasifier, fluidized bed gasifier and entrained bed gasifier. These gasifiers differ by the way in which the reactants are introduced, the way in which the oxidant-fuel mixture is made, the temperature and pressure conditions and the process for removing the ash or slag, liquid residues resulting from the reaction.

The article entitled "Refractories for Gasification" published in the journal Refractories Applications and News, Volume 8, Number 4, July-August 2003, written by Wade Taber of the Energy Systems Department of the Saint-Gobain Industrial Ceramics Division, describes the structure of an internal lining for a gasifier.

The refractory products of an internal gasifier lining are subjected to thermal cycling, corrosion and erosion by the slag or dry ash and the effect of hot spots where the temperature may typically reach about 1400° C. The erosion and corrosion may especially result in the infiltration, into the pores of the refractory products, of slag compounds or liquefied ash, which themselves, under the effect of the erosion and the thermal cycling, may cause the lining to flake off and finally stop the gasifier.

Moreover, the development of gasification of black liquors resulting from the manufacture of paper pulp requires new materials that are capable of withstanding the corrosive action of sodium compounds and, in particular, have a low porosity in order to prevent infiltration of aggressive substances.

To increase the lifetime of refractory linings, researchers have tried to increase its thickness. However, this solution has the drawback of increasing the costs and of reducing the useful volume of the gasifier, and therefore reducing its efficiency.

James P. Bennett, in the article "Refractory liner used in slagging gasifiers" published in the journal Refractories Applications and News, Volume 9, number 5, September-October 2004, pages 20-25, explains that the lifetime of current gasifier refractory linings, in particular in air-cooled systems, is very limited despite their high chromium oxide content. Mentioned in particular is the report by S. J. Clayton, G. J. Stiegel and J. G. Wimer "Gasification Technologies, Gasification Markets and Technologies—Present and Future, an Industry Perspective", US DOE, DOE/FE report 0447, July 2002. The use of products containing chromium has also been abandoned in the case of black liquor gasification.

The fused-cast product described in FR 2 946 044 has a porosity low enough to limit the infiltration of slag compounds or liquefied ash. However it has a problem of exudation at high temperature (typically between 1000 and 1200° C.) in air.

Other fused products are, for example, known from GB 611 245 or JP 10 067 569. However they have an unsatisfactory corrosion resistance.

There is therefore a need for a refractory product having properties tailored to the specific environments encountered inside gasifiers and in particular having a porosity low enough to limit the infiltration of slag compounds or liquefied ash and that has a lower risk of exudation.

The aim of the present invention is to meet this need.

SUMMARY OF THE INVENTION

More particularly, the invention relates to a fused-cast refractory product having a chemical composition such that, in percentages by weight on the basis of the oxides:
  $Al_2O_3$: balance to 100%;
  MgO: 26% to 50%, or even 26% to 45%;
  $ZrO_2$ 0.5% to 10.0%;
  $B_2O_3$: ≤1.5%;
  $SiO_2$: ≤0.5%;
  $Na_2O+K_2O$: ≤0.3%;
  CaO: ≤1.0%;
  $Fe_2O_3+TiO_2$: <0.55%;
  other oxide species: <1.0%.

As will be seen later, the inventors have surprisingly discovered that this composition makes it possible with a fused refractory product according to the invention to have a low porosity while maintaining a high corrosion resistance and without having a risk of exudation.

A refractory product according to the invention may also have one or more of the following optional features:
  the weight content of $ZrO_2$ is greater than or equal to 1.0%, or even greater than or equal to 1.5%, or even greater than or equal to 2.0% and/or less than or equal to 7.0%, less than or equal to 5.0%, less than or equal to 4.0%, or even less than or equal to 3.0%;

more than 70%, more than 80%, more than 90%, or even substantially 100% by volume of the zirconia is in monoclinic form;

the weight content of $B_2O_3$ is greater than or equal to 0.05%, preferably greater than or equal to 0.1%, preferably greater than or equal to 0.2%, or even greater than or equal to 0.3%, or even greater than or equal to 0.4%;

the weight content of $B_2O_3$ is less than or equal to 1.0%, preferably less than 0.8%, or even less than or equal to 0.6%, or even less than or equal to 0.5%;

preferably, the weight content of fluorine (F) is less than 0.5%, or even less than 0.3%, or even less than 0.1% or even less than 0.05%;

preferably, the sum of the weight contents of the elements boron (B), fluorine (F) and silicon (Si) is greater than or equal to 0.01% and/or less than 0.1%;

preferably, the elementary weight ratio R of the content of zirconium (Zr) to the total content of boron (B), fluorine (F) and silicon (Si), i.e. R=Zr/(B+F+Si), is between 2 and 80, preferably between 4 and 50, preferably between 5 and 40, or even between 7 and 30, or even between 9 and 20;

preferably, the elementary weight content of fluorine is greater than 0.02%, preferably greater than 0.05% and/or less than 0.40%, preferably less than 0.35%;

preferably, the elementary weight content of boron is greater than 0.03%, preferably greater than 0.05% and/or less than 0.45%;

preferably, the elementary weight content of silicon is greater than 0.03%, preferably greater than 0.05% and/or less than 0.23%;

the weight content of $Cr_2O_3$ is less than 0.1%, preferably less than 0.09%, preferably less than 0.08%, preferably less than 0.05%;

the weight content of alumina $Al_2O_3$ is less than or equal to 70%, or even less than or equal to 68%;

the weight content of alumina $Al_2O_3$ is greater than or equal to 55%, or even greater than or equal to 60%;

the weight content of magnesia MgO is less than or equal to 40%, or even less than or equal to 35%;

the weight content of magnesia MgO is greater than or equal to 27%, or even greater than or equal to 29%, or even greater than or equal to 32%;

the weight ratio of $Al_2O_3$ to MgO is less than 2.6, which advantageously avoids the formation of corundum, and/or, preferably, greater than 1.2, which advantageously reduces the tendency of the product toward rehydration and limits the thermal expansion coefficient;

the weight content of CaO is less than or equal to 0.8%, less than or equal to 0.6%, or even less than or equal to 0.4%;

the weight content of ($Na_2O+K_2O$) is less than or equal to 0.25%, less than or equal to 0.2%, or even less than or equal to 0.1%;

the weight content of silica $SiO_2$ is less than or equal to 0.4%, or even less than or equal to 0.3%, or even less than or equal to 0.2%, or even less than or equal to 0.15%;

the iron and/or titanium and/or calcium oxides are only present as impurities;

the weight content of iron and/or titanium oxides, $Fe_2O_3+TiO_2$, in particular of iron oxide $Fe_2O_3$, is less than 0.4%, preferably less than 0.3%, preferably less than 0.2%;

the "other oxide species" consist only of impurities;

the total weight content of the "other oxide species" is less than 0.4%, or even less than 0.3%;

the weight content of CuO is less than or equal to 0.5%, less than or equal to 0.4%, less than or equal to 0.3%, less than or equal to 0.2%, less than or equal to 0.1%, or even less than or equal to 0.05%;

the weight content of chromium oxide is less than 0.2%, preferably less than 0.1%;

preferably, the chromium oxide is only present as impurities.

The invention also relates to a process for manufacturing a refractory product according to the invention, comprising the following successive steps:

a) mixing of raw materials so as to form a feedstock, b) melting of said feedstock so as to obtain a molten material; and, c) casting and solidification of said molten material, by cooling, so as to obtain a refractory product, this process being noteworthy in that said raw materials are chosen in such a way that said refractory product is in accordance with the invention.

The invention also relates to a block preferably weighing more than 1 kg and made of a product according to the invention or manufactured using a process according to the invention. It also relates to a product obtained immediately after the step c) of a process according to the invention (before putting into service).

The invention also relates to a gasifier lining or metallurgical furnace lining in kit form, comprising an assembly of parts made of a product according to the invention, the respective shapes of said parts being adapted so as to form said lining by assembly. In particular, the lining may be designed to allow passage of at least one conduit by matching the external shape of said conduit and/or to have at least one reentrant angle.

The refractory lining preferably takes the form of an assembly of blocks.

A block made of a product according to the invention may be, for example, in the form of a brick or of a cruciform block (in particular for the regeneration chambers of glass furnaces), or in the form of a key brick in a crown.

The invention also relates to a device selected from:

a gasifier, a metallurgical furnace, in particular a blast furnace and especially a bosh, a tuyere belt, a hearth, a belly, a stack of a blast furnace, an anode baking furnace, in particular for anodes intended for electrolysis, for example of aluminum, a cupola furnace, in particular intended for remelting metals or for melting rocks, a municipal waste incinerator, a glass furnace, a regeneration chamber of a glass furnace, an electrolytic cell for the electrolysis, in a molten salt medium, of nonferrous metals, especially aluminum or magnesium or even titanium, a device for protecting or regulating streams of cast iron or steel, for example a slide-valve shut-off plate, a stream shroud tube, a submerged nozzle or a stopper-rod assembly, an agitation device, either of mechanical or gas-injection type, for agitation in a molten metal, a seating block serving as a housing and support for a gas-injection device or for an injection device for regulating a metal stream, an impact tile for ladles or tundishes, a foundry accessory for cast iron, steel and special steels such as a nozzle, a stopper or a spout, a support for firing ceramic products (kiln support), preferably in the form of a thin product, a device for storing heat energy released by a fluid, for example air or steam or oil, referred to as a "regenerator", in particular as energy storage media ("*A review on packed bed solar energy storage systems*", Renewable and Sustainable Energy Reviews, 14 (2010), p. 1059-1069, describes the prior art in the field of regenerators), said device comprising a product according to the invention or manufactured using a process according to the invention, especially in the form of a block or in a lining.

The product may in particular be in contact or be positioned in a region intended to be in contact with a slag, coal or a corrosive liquor, for example a black liquor resulting from the manufacture of paper pulp, or with a molten metal, in particular a ferrous metal, or with molten glass, or with alkaline vapors or liquid condensates resulting from the melting of a glass.

Specifically, the product may also be used in an abrasion-resistant lining, in particular in an application in which it is in contact with an abrasive agent consisting of particles in suspension in a fluid (cyclone dust, carbon black in gasifier, etc.), of a fluid circulating at high speed (spray nozzle, etc.) or of heavy solid products rubbing/circulating over the surface of the material (pusher furnaces, drying of ores).

DEFINITIONS

The weight contents of oxides relate to the overall contents for each of the corresponding chemical elements, expressed in the form of the most stable oxide, using the standard convention in the industry. These therefore include suboxides and possibly nitrides, oxynitrides, carbides, oxycarbides, carbonitrides and even metallic species of the abovementioned elements.

However, it is well known that fluorine does not have a stable oxide and that it does not therefore participate in the "basis of the oxides", and in particular that it is not counted in the "other oxide species". Its content is conventionally measured by elemental analysis, for example by ion chromatography after extraction by thermal hydrolysis.

The term "molten material" is understood to mean a liquid mass which, to retain its shape, must be contained in a container. This mass may contain a few solid particles, but in an amount insufficient to be able to structure said mass.

The term "impurities" is understood to mean the inevitable constituents, involuntarily and necessarily introduced with the raw materials or resulting from reactions with these constituents. The impurities are not necessary constituents, but are merely tolerated. For example, compounds forming part of the group of oxides, nitrides, oxynitrides, carbides, oxycarbides, carbonitrides and metallic species of iron, titanium, vanadium and chromium are preferably impurities.

Unless otherwise mentioned, all the contents of oxides in the products described and claimed are percentages by weight on the basis of the oxides.

DETAILED DESCRIPTION OF THE INVENTION

In a fused-cast product according to the invention, the combination of a high alumina content with an MgO content greater than 26% makes it possible to obtain a product of crystalline structure comprising predominantly $Al_2O_3$—MgO spinel capable of meeting the requirements of high resistance to slag, to corrosive liquors and to certain molten glass, in particular soda-lime glass or else boron-loaded glass, especially borosilicate glass.

The inventors have found that a presence of zirconia $ZrO_2$ according to the invention advantageously enables products to be obtained that have a low porosity, that withstand thermal cycling well and that do not exude at high temperature, provided that the content of $ZrO_2$ is between 0.5% and 10% by weight.

The inventors have also discovered that the combined presence of zirconia $ZrO_2$ and boron, for example in $B_2O_3$ form, advantageously makes it possible to obtain an optimum for the desired properties. The inventors have observed that the zirconia is then mainly in monoclinic form. This form of the zirconia is surprising for a product synthesized by melting at high temperature. Indeed, such melting normally results in the presence of zirconia in cubic form.

The ratio $R=Zr/(B+F+Si)$ is between 2 and 80. It is preferably greater than or equal to 4, preferably greater than or equal to 5, preferably greater than or equal to 7, or even greater than or equal to 9, and/or preferably less than or equal to 50, preferably less than or equal to 40, preferably less than or equal to 30, or even less than or equal to 20.

An elementary weight ratio R which is too low results in a product that is insufficiently densified and potentially porous. If the elementary weight ratio R is too high, the product with equivalent density is more sensitive to thermal shock and to corrosion with respect to certain aggressive agents such as alkali metals.

The content of silica $SiO_2$ must not exceed 0.5% as it may impair the corrosion resistance. In particular, with too high a content, the silica could combine with the impurities to increase the glassy phase, harmful to corrosion resistance, or react with alumina to form mullite. Yet, the presence of mullite is prejudicial to the resistance to corrosion by papermaking black liquors.

In a product according to the invention, the oxides $Na_2O$ and $K_2O$ are considered to have similar effects. The oxides $Na_2O$ and $K_2O$ have an unfavorable effect on the resistance to the formation of beta-alumina and tend to increase the content of the glassy phase. The weight content of $Na_2O+K_2O$ must therefore be less than or equal to 0.3%.

The weight content of CaO must also be less than or equal to 1.0%, preferably less than or equal to 0.4%.

According to the invention, the weight content of $Fe_2O_3+TiO_2$ is less than 0.55% and, preferably, the weight content of $Cr_2O_3$ is less than 0.2%, preferably less than 0.10%. This is because these oxides are deleterious and their content must preferably be limited to traces, preferably introduced as impurities with the raw materials.

The "other oxide species" are species other than $Al_2O_3$, MgO, $ZrO_2$, $B_2O_3$, $SiO_2$, $Na_2O$, $K_2O$, CaO, $Fe_2O_3$ and $TiO_2$. In one embodiment, the "other oxide species" are limited to species whose presence is not particularly desired and which are generally present as impurities in the raw materials.

Conventionally, in a fused-cast product such as a product according to the invention, the oxides represent more than 98.5% or more than 99% or even substantially 100% of the weight of the product. The same applies in a product according to the invention.

A product according to the invention may have a complex shape. In particular, it may take the form of a brick or block having a nonplanar surface, for example a concave and/or convex surface, especially a cylindrical, conical or angled surface. A complex shape makes it possible in particular to fit the arrangement of the members of a gasifier and in particular for ducts to pass therethrough.

A product according to the invention may be in the form of a block having dimensions of greater than 100 mm×100 mm×100 mm.

In one embodiment, the product is in the form of a block having a weight of greater than 5 kg. It may have a shrinkage cavity, i.e. a macroscopic porous volume located in one portion of the block if this portion has not been removed by machining of the solidified bloc. This shrinkage cavity is linked to the shrinkage of the product during the solidification. The portion of the block outside of the shrinkage cavity is densified. This densest zone of the block, referred to as the "sound zone", preferably represents at least 10%, preferably at least 20% by volume of the block. This zone preferably has an open porosity of less than 7%, preferably less than 6%, preferably less than 5%, or even less than 3%.

The bulk density of the sound zone is preferably greater than 3.20 g/cm$^3$, more preferably greater than 3.25 g/cm$^3$, more preferably greater than 3.30 g/cm$^3$, or even greater than 3.40 g/cm$^3$, or even greater than 3.45 g/cm$^3$, or even greater than 3.50 g/cm$^3$.

In the sound zone, the various oxides are distributed substantially homogeneously. In particular, there is no systematic change (increase or decrease) in an oxide close to the outer surface of the product.

A product according to the invention may be conventionally manufactured via the steps a) to c) described below:
a) mixing of raw materials so as to form a feedstock;
b) melting of said feedstock so as to obtain a molten material; and
c) solidification of said molten material, by cooling, so as to obtain a refractory product according to the invention.

In step a), the raw materials are chosen so as to guarantee the oxide contents in the end product.

Preferably, the oxides for which a minimum content is necessary, especially $Al_2O_3$, MgO and $ZrO_2$ or precursors of these oxides, for example $AlF_3$, are added systematically and methodically. $AlF_3$ advantageously facilitates the onset of melting and limits the risks of cracking.

Preferably, the contents of these oxides in the sources of the other oxides are taken into account.

Where appropriate, boron may be introduced in the form of $B_2O_3$ or by any precursor, including $B_4C$ or $ZrB_2$, or even $CaB_6$, preferably in a form that limits excessively rapid fly-off during melting.

Fluorine is preferably provided in the form of a fluoride of an element whose presence is necessary in a product according to the invention, for example in the form $MgF_2$ or $ZrF_4$. It may also be provided, for example, in the form of $KBF_4$, KF or NaF or of ores comprising at least one of these fluorides.

In step b), the melting is preferably carried out by combining the action of quite a long electric arc, causing no reduction, with stirring, which promotes reoxidation of the products. Short or moderately short arc adjustment can also be used for producing the product.

To minimize the formation of nodules with a metallic aspect and to avoid formation of cracks or crazes in the end product, it is preferable to carry out the melting operation under oxidizing conditions.

Preferably, the long-arc melting process described in French patent No. 1 208 577 and its additions No. 75893 and No. 82310 is used.

This process consists in using an electric arc furnace in which the arc is struck between the charge and at least one electrode away from this charge, and in adjusting the length of the arc so that its reducing action is minimized, while still maintaining an oxidizing atmosphere above the molten bath and stirring said bath.

The melting operation may in particular be carried out at a temperature above 2000° C., preferably between 2050° C. and 2200° C.

In step c), the cooling can be varied according to the molding technology necessary for producing the parts.

Preferably, in step c), the casting temperature is greater than or equal to 2000° C.

In step c), two routes are possible:
casting into a mold wedged in a formwork using a granular insulator. The cooling is then natural, the process being called a "transferless" process; and
casting into a mold which is opened very rapidly to extract the part and to insert it into a box containing an insulator. The part is then immediately covered with insulator, the process being called a "transfer" process.

In the latter technology, the cooling is controlled, preferably so as to be carried out at a rate of less than 20° C. per hour, preferably at a rate of about 10° C. per hour.

A product of the invention thus manufactured mainly consists of alumina-magnesia spinel and periclase crystals. Preferably, a product according to the invention comprises less than 10%, less than 5%, less than 2%, less than 1%, in percentages by weight, or even substantially no alumina crystals.

EXAMPLES

The following nonlimiting examples are given for the purpose of illustrating the invention.

In these examples, the following raw materials were employed:
calcined alumina mainly containing, as weight average, 99.5% $Al_2O_3$, 0.27% $Na_2O$ and 100 ppm $SiO_2$;
$AlF_3$ containing at most 0.15% $SiO_2$ and at most 0.25% $Na_2O$;
calcined high-purity synthetic magnesia, containing 98.5% MgO, at most 0.9% CaO, 0.2% $SiO_2$ and at most 0.6% $Fe_2O_3$;
boron carbide, containing 76.25% boron, 20.1% carbon and 0.18% $Fe_2O_3$;
zirconia CC10 supplied by SEPR having a median diameter of around 3 microns; and
copper oxide $Cu_2O$ typically containing 98.7% $Cu_2O$ and 0.7% metallic copper.

The raw materials were melted using the conventional arc-furnace melting process, as described above, and then the molten material was cast to obtain blocks.

The chemical analysis of the products obtained is given in table 1, namely an overall average chemical analysis, given in percentages by weight. The elemental chemical analyses are carried out by x-ray fluorescence. The boron is assayed by inductively coupled plasma (ICP) spectrometry, and the fluorine is assayed by ion chromatography after extraction by pyrohydrolysis.

In table 1 below, * indicates that the example is outside the invention and an empty box corresponds to a content less than or equal to 0.04% by weight. The balance to 100% consists of the oxide species other than those mentioned in the table.

The total porosity is given by the following equation:

Total porosity=100×(absolute density−bulk density)/absolute density

The bulk density and the open porosity are measured according to the ISO 5017 standard on a bar withdrawn from the core of the block, in the sound zone.

The absolute density is measured on ground powder by means of a helium pycnometer.

The resistance to thermal cycling is measured in the following manner: samples having a size of 50×50×50 mm$^3$ are prepared by cutting from the block in the sound zone. Five samples for each example are placed in a furnace at 1100° C. in air for 30 minutes then submerged in water at 20° C. for 5 minutes. The test is repeated until failure of the samples. Table 1 provides the mean number of cycles that the 5 samples withstood.

X-ray diffraction analysis revealed the presence predominantly of spinel and periclase phases. The form of the zirconia was identified by x-ray diffraction. "C" stands for cubic, "n.m." stands for not measured and "NA" stands for not applicable.

TABLE 1

| | 1* | 2* | 3* | 4* | 5 | 6 | 7 | 8 | 9 | 10 | 11 | 12 | 13* |
|---|---|---|---|---|---|---|---|---|---|---|---|---|---|
| | | | | | Chemical composition on the basis of the oxides | | | | | | | | |
| $Al_2O_3$ | 71.4 | 63.24 | 62.82 | 61.88 | 62.4 | 60.6 | 62.4 | 66.0 | 61.6 | 65.1 | 58.6 | 63.6 | 56.4 |
| MgO | 27.6 | 35.2 | 36 | 35.91 | 34.6 | 38.0 | 34.6 | 30.7 | 34.1 | 29.1 | 34.2 | 26.0 | 31.4 |
| $ZrO_2$ | <0.1 | <0.1 | <0.1 | <0.1 | 2.6 | 0.5 | 2.2 | 2.5 | 2.9 | 4.8 | 5.6 | 9.1 | 11.3 |
| $B_2O_3$ | 0.3 | 0.6 | 0.3 | 0.5 | <0.05 | 0.4 | 0.3 | 0.3 | 0.7 | 0.4 | 0.9 | 0.8 | 0.4 |
| $SiO_2$ | 0.08 | 0.05 | 0.08 | 0.05 | <0.05 | 0.05 | 0.05 | 0.12 | <0.05 | 0.13 | <0.05 | <0.05 | 0.07 |
| $Na_2O + K_2O$ | 0.11 | 0.09 | 0.13 | ≤0.3 | 0.09 | 0.11 | 0.09 | 0.08 | 0.09 | <0.05 | 0.10 | 0.11 | 0.08 |
| CaO | 0.14 | 0.35 | 0.05 | 0.5 | 0.18 | 0.23 | 0.28 | 0.14 | 0.28 | 0.15 | 0.27 | 0.13 | 0.2 |
| $Fe_2O_3 + TiO_2$ | 0.11 | 0.18 | 0.13 | 0.21 | 0.13 | 0.11 | 0.10 | 0.16 | 0.16 | 0.15 | 0.15 | 0.20 | 0.12 |
| CuO | | 0.13 | 0.49 | 0.19 | <0.05 | <0.05 | <0.05 | <0.05 | <0.05 | <0.05 | <0.05 | <0.05 | <0.05 |
| Other oxides | | | | | Balance to 100% | | | | | | | | |
| Form of the zirconia | NA | NA | NA | NA | C | n.m. | | Monoclinic zirconia | | | | | C |
| Zr/(B + F + Si) | <0.3 | <0.2 | <0.4 | <0.4 | >40 | 2 | 13 | 11 | 9 | 17 | 13 | 24 | 47 |
| Bulk density ($g/cm^3$) | | 3.44 | 3.43 | 3.35 | 3.34 | 3.44 | 3.51 | 3.50 | 3.55 | 3.50 | 3.51 | 3.53 | 3.53 |
| Total porosity (%) | 10.9 | 3.8 | 4.5 | 6.5 | | | | | | | | | |
| Open porosity (%) | 9.5 | 2.8 | 3.0 | 3.5 | 7.2 | 1.7 | 0.7 | 1.5 | 0.6 | 3.4 | 1.8 | 1.2 | 2.2 |
| Resistance to thermal cycling | | 0.7 | 0.6 | 0.8 | 4 | 2.5 | 2.6 | 3.0 | 2.9 | 2.8 | 2.5 | 2.0 | 1.8 |

Exudation was observed on the blocks from examples 2 to 4 after heat treatment at 1100° C. for 30 minutes. The outer surface of the block observed has greasing formed by blisters of greenish color composed of alumina, magnesia, silica and copper. This phenomenon was not observed on the blocks of the examples according to the invention.

The results show that the tested products of the invention have an improved resistance to thermal cycling with respect to those of the comparative examples. Furthermore, the products according to the invention have an excellent compromise between the open porosity and the resistance to thermal cycling for the compositions comprising zirconia and boron.

The results also show that the prior art compositions comprising CuO may be advantageously replaced by a composition according to the invention in order to obtain a product that is simultaneously not very porous, withstands thermal cycling better and does not have exudation problems.

Of course, the present invention is not limited to the embodiments described, these being provided as illustrative and nonlimiting examples.

The invention claimed is:

1. A fused-cast refractory product having a chemical composition such that, in percentages by weight on the basis of the oxides:
   $Al_2O_3$: balance to 100%;
   MgO: 26% to 50%;
   $ZrO_2$: 0.5% to 10.0%;
   $B_2O_3$: ≤1.5%;
   $SiO_2$: ≤0.5%;
   $Na_2O+K_2O$: ≤0.3%;
   CaO: ≤1.0%;
   $Fe_2O_3+TiO_2$: <0.55%;
   other oxide species: <1.0%;
provided that an elementary weight ratio R of the content of zirconium Zr to the total content of boron B, fluorine F and silicon Si is between 2 and 80.

2. The product as claimed in claim 1, wherein the weight content of $ZrO_2$ is greater than or equal to 1.0%.

3. The product as claimed in claim 2, wherein the weight content of $ZrO_2$ is greater than or equal to 2.0%.

4. The product as claimed in claim 1, wherein the weight content of $ZrO_2$ is less than or equal to 7.0%.

5. The product as claimed in claim 4, wherein the weight content of $ZrO_2$ is less than or equal to 5.0%.

6. The product as claimed in claim 1, wherein more than 70% by volume of the zirconia is present in monoclinic form.

7. The product as claimed in claim 1, wherein the weight content of $B_2O_3$ is greater than or equal to 0.05%.

8. The product as claimed in claim 7, wherein the weight content of $B_2O_3$ is greater than or equal to 0.1%.

9. The product as claimed in claim 8, wherein the weight content of $B_2O_3$ is greater than or equal to 0.2%.

10. The product as claimed in claim 1, wherein the weight content of $B_2O_3$ is less than or equal to 0.6%.

11. The product as claimed in claim 10, wherein said elementary weight ratio R is between 5 and 50.

12. The product as claimed in claim 11, wherein said elementary weight ratio R is between 7 and 30.

13. The product as claimed in claim 1, wherein the weight content of CuO is less than or equal to 0.4%.

14. The product as claimed in claim 1, wherein
the weight content of alumina $Al_2O_3$ is less than or equal to 70% and greater than or equal to 55%, and/or
the weight content of MgO is less than or equal to 40% and greater than or equal to 29%.

15. The product as claimed in claim 14, wherein
the weight content of alumina $Al_2O_3$ is less than or equal to 68% and greater than or equal to 60%, and/or
the weight content of MgO is less than or equal to 35% and greater than or equal to 32%.

16. The product as claimed in claim 1, wherein the weight ratio of $Al_2O_3$ to MgO is less than 2.6 and greater than 1.2.

17. The product as claimed in claim 1, wherein
the weight content of CaO is less than or equal to 0.6%; and/or
the weight content of $Na_2O+K_2O$ is less than or equal to 0.25%; and/or
the weight content of silica $SiO_2$ is less than or equal to 0.15%; and/or
the weight content of iron and/or titanium oxides, $Fe_2O_3+TiO_2$, is less than 0.4%; and/or
the weight content of chromium oxide is less than 0.1%, and/or
the weight content of CuO is less than or equal to 0.1%.

18. A device selected from:
a gasifier,
a metallurgical furnace,
an anode baking furnace,
a cupola furnace,
a municipal waste incinerator,
a glass furnace,
a regeneration chamber of a glass furnace,
an electrolytic cell for the electrolysis, in a molten salt medium, of nonferrous metals,
a device for protecting or regulating streams of cast iron or steel,
an agitation device, either of mechanical or gas-injection type, for agitation in a molten metal,
a seating block serving as a housing and support for a gas-injection device or for an injection device for regulating a metal stream,
an impact tile for ladles or tundishes,
a foundry accessory for cast iron, steel and special steels,
a support for firing ceramic products,
a regenerator, said device comprising a product as claimed in claim 1.

19. An assembly comprising a device as claimed in claim 18, and a material selected from a slag, coal, a corrosive liquor, a molten metal, a molten glass, alkaline vapors, liquid condensates resulting from the melting of glass, and an abrasive material, said product being in contact with said material.

* * * * *